L. E. CLOW.
STOVE-PIPE COUPLING.

No. 180,416. Patented Aug. 1, 1876.

WITNESSES.
Charles Pickles
Saml. S. Boyd

INVENTOR.
Lewis E. Clow.
By Chas. D. Moody.
his atty.

UNITED STATES PATENT OFFICE.

LEWIS E. CLOW, OF ST. LOUIS, MISSOURI, ASSIGNOR TO THE EXCELSIOR MANUFACTURING COMPANY, OF SAME PLACE.

IMPROVEMENT IN STOVE-PIPE COUPLINGS.

Specification forming part of Letters Patent No. 180,416, dated August 1, 1876; application filed June 15, 1876.

*To all whom it may concern:*

Be it known that I, LEWIS E. CLOW, a resident of St. Louis, Missouri, have invented a new and useful Improvement in Stove-Pipe Couplings, of which the following is a full, clear, and exact description, reference being had to the annexed drawing, making part of this specification, in which—

Figure 1:
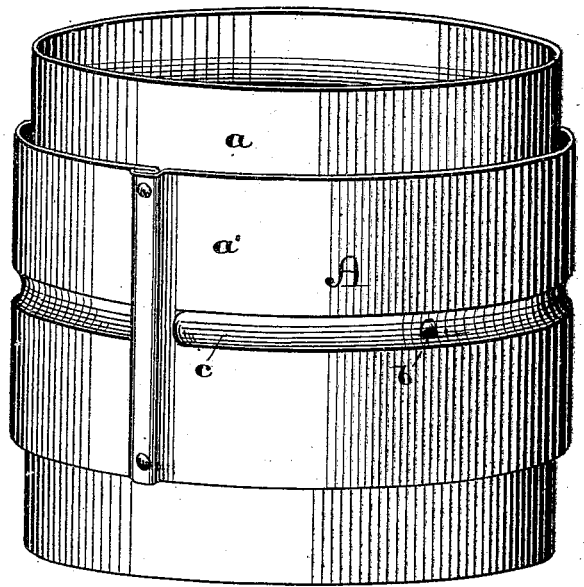
Figure 2:
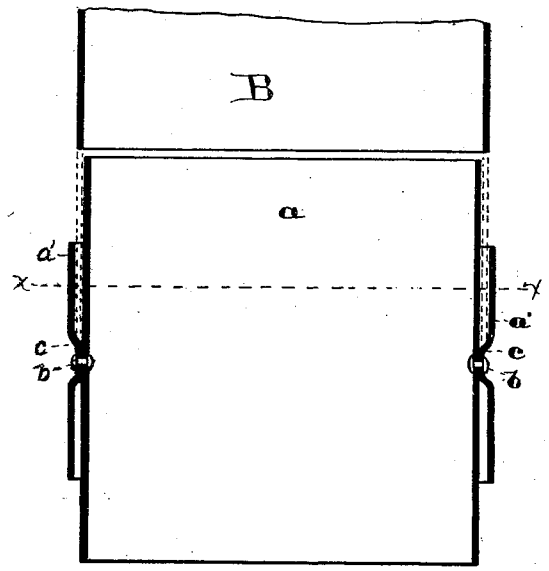
Figure 3:
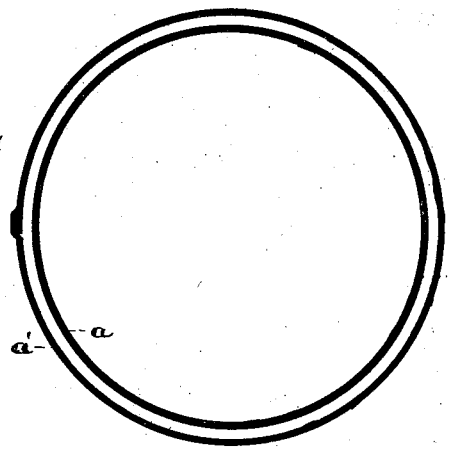

Figure 1 is a view in perspective of the improved coupling; Fig. 2, a longitudinal section of the coupling and of the end of a joint of pipe; and Fig. 3, a cross-section upon the line $x$ $x$ of Fig. 2.

Similar letters refer to similar parts.

The aim of the present invention is to provide means for readily, firmly, and properly connecting joints of stove and other pipe.

Referring to the annexed drawing, A represents the improved coupling. It consists of an inner tube, $a$, and an outer tube, $a'$, the latter being arranged around the former and fastened thereto, and, preferably, by means of rivets $b$ $b$, &c. Both of the tubes are cylindrical. The inner tube, in diameter, is made just small enough for the joint of the pipe to slip readily and snugly upon it, and the outer tube is just enough larger to receive the end of the joint between it and the inner tube. By means of the corrugation $c$ the outer tube (and, preferably, midway in its length) is closed in upon the inner tube, and so that the end of the joint cannot, when attached to the coupling, pass beyond the corrugation. The latter, also, serves to strengthen the coupling. If desired, the rivets $b$ $b$, &c., can be made to serve as a stop to prevent the joints of the pipe from coming together, and, for that purpose, can be attached to either the inner or outer tube only, and the other tube may be dispensed with. The tubes are of suitable length, and the inner one $a$ is, preferably, longer than the outer one $a'$, and it is, preferably, arranged so as to project similarly at either end beyond the outer tube. B, Fig. 2, represents the end of a joint of pipe. Instead of making such joint slightly tapering, as is customary, I make it cylindrical, and, in diameter, so as to enter the space between the two tubes of the coupling, and as indicated by the dotted lines in Fig. 2.

In operation, the coupling is arranged between the joints of the pipe, and the joints, instead of being slipped upon each other, are slipped, respectively, upon either end of the inner tube, or, what is the same thing, into either end of the outer tube, and until they, respectively, from either end of the coupling, encounter the corrugation $c$, or rivets $b$ $b$, &c.

By reason of the cylindrical form of the various parts the coupling is readily effected, even by an unskilled person; and when the joints are coupled, and the pipe set up, the former are kept in place by means either of the corrugation $c$, or the rivets $b$ $b$, &c. The outer band $a'$ is of considerable value in stiffening the piping laterally.

What I claim is—

1. The combination of the inner band $a$, outer band $a'$, and the rivets $b$ $b$, &c., substantially as described.

2. The herein-described stove-pipe coupling A, consisting of the tube $a$, tube $a'$, and corrugation $c$, combined and operating substantially as described.

3. The combination of the coupling A, and the cylindrical joint B, substantially as and for the purpose described.

LEWIS E. CLOW.

Witnesses:
CHAS. D. MOODY,
SAML. S. BOYD.